US008296788B2

(12) United States Patent  (10) Patent No.: US 8,296,788 B2
Kirihara et al.  (45) Date of Patent: Oct. 23, 2012

(54) OPTICAL DISC APPARATUS

(75) Inventors: Sojiro Kirihara, Kawasaki (JP); Hiroshi Yamagishi, Chiba (JP); Yousuke Ishizuka, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 30 days.

(21) Appl. No.: 13/080,304

(22) Filed: Apr. 5, 2011

(65) Prior Publication Data

US 2011/0252436 A1    Oct. 13, 2011

(30) Foreign Application Priority Data

Apr. 7, 2010  (JP) ................................. 2010-088619

(51) Int. Cl.
*G11B 17/04*    (2006.01)
(52) U.S. Cl. ...................................................... 720/652
(58) Field of Classification Search ................. 720/652, 720/648, 603, 649, 617, 655, 695, 601, 624, 720/657, 620, 626, 653, 646, 634, 651
See application file for complete search history.

(56) References Cited

U.S. PATENT DOCUMENTS

2002/0136140 A1    9/2002  Arase
2007/0124746 A1*   5/2007  Shizuya et al. ............... 720/649
2009/0119692 A1*   5/2009  Fujimori et al. .............. 720/652

FOREIGN PATENT DOCUMENTS

JP        2002-279717        9/2002

* cited by examiner

*Primary Examiner* — Allen Cao
(74) *Attorney, Agent, or Firm* — McDermott Will & Emery LLP

(57) ABSTRACT

A printed circuit board (PCB) is attached on a surface of a tray that is opposed to a chassis main or a bottom plate of a housing. On the tray and in a vicinity of a position where the PCB is disposed, a first protruding portion is formed to protrude toward the chassis main, on which a second protruding portion is formed at a position to be opposed to the first protruding portion. Between the first protruding portion and the second protruding portion is a clearance while the tray is accommodated in the housing. When the tray deforms, the second protruding portion supports the first protruding portion to prevent further deformation of the tray.

6 Claims, 4 Drawing Sheets

(REAR SIDE)

(FRONT SIDE)

A-A SECTION (LOWER SIDE)   (UPPER SIDE)

B-B SECTION (LOWER SIDE)   (UPPER SIDE)

OPTICAL DISC APPARATUS

CLAIM OF PRIORITY

The present application claims priority from Japanese patent application serial No. JP2010-088619, filed on Apr. 7, 2010, the content of which is hereby incorporated by reference into this application.

BACKGROUND OF THE INVENTION (1) Field of the Invention

The present invention relates to an optical disc apparatus for recording and reproducing data on and from an optical disc, and particularly to a technique to improve the resistance to an impact exerted when a tray, on which an optical disc is mountable, is accommodated in a housing.

(2) Description of the Related Art

A typical optical disc apparatus used in an electronic apparatus has a tray that is held such that the tray is movable into and out of a main body, or a housing, of the optical disc apparatus. To load an optical disc, an optical disc is put or mounted on the tray while the tray is outside the housing, and the tray is moved back into the housing. In a thin optical disc apparatus, a mechanism called "unit mecha assembly" (hereinafter referred to as "mechanical unit") is attached on the tray and moved integrally therewith. The mechanical unit includes a spindle motor for rotating an optical disc, and an optical pickup movable in a radial direction of the optical disc and capable of recording and reproducing data on and from the optical disc by emitting a laser beam.

When used in a small-sized electronic apparatus, e.g., laptop computer, the optical disc apparatus is reduced in its thickness, and its weight is also required to be reduced. Hence, as materials forming the optical disc apparatus, plate-like materials with a small thickness are employed. This makes the housing (chassis) and the tray apt to bend or warp upon reception of an impact from the exterior. When the force of the impact is great, the housing and the tray accommodated in the housing may hit each other, or the smoothness in the movement of the tray into and out of the housing may be impaired.

As related art, JP-A No. 2002-279717 discloses a structure to prevent the tray from deforming to be convex downward. That is, the tray has a contact portion in the form of a rib downward protruding from a bottom plate of the tray, and the chassis has a receiving portion that supports the contact portion of the tray from the under side.

SUMMARY OF THE INVENTION

Further, there are employed structures to reduce the thickness of the optical disc apparatus, one of which may be called "slim type" and is such that the tray and the mechanical unit including the spindle motor and the optical pickup are integrated. Another may be called "PCB-integrated type" and is such that on an under surface of the tray is attached a printed circuit board (PCB) in which a circuit for driving the mechanical unit is implemented. In the PCB-integrated structure, the space is efficiently used in disposing members and parts in the housing, by effectively making use of the under surface of the tray. However, the PCB-integrated structure where a clearance between a surface of the PCB and an inner surface of the housing is relatively small has a drawback such that upon exertion of an impact from the exterior, the PCB hits the chassis or the housing, which may result in damage of the PCB.

According to the apparatus disclosed in the publication JP-A No. 2002-279717, the contact portion in the form of a rib formed on the bottom plate of the tray is made to contact with the receiving portion of the chassis so as to prevent the tray from deforming to be convex downward, thereby stabilizing the movement of loading and unloading of a disc. The arrangement where the contact portion of the tray is contacted with the receiving portion of the chassis allows transmission of vibrations from the tray to the chassis, which tends to exacerbate the noise. Further, the mechanical unit and the tray in the apparatus are two separate members, and the apparatus involves a clamp mechanism for clamping onto the mechanical unit a disc on the tray as has been advanced to and located at a clamping position. This structure may be called "half-height type", in which the thickness or height of the housing and accordingly the clearance between the under surface of the tray and the housing is larger than in the slim type. Although the publication does not teach to do so, if the PCB is integrated with the tray in the apparatus of the publication, the hitting of the PCB against the chassis would less occur.

An object of this invention is to provide an optical disc apparatus which can prevent that upon a tray receiving an impact, a PCB, which is integrated with the tray, hits against a housing (chassis) and is damaged.

The object is attained by the invention which provides an optical disc apparatus including a tray on which an optical disc is mounted, and a housing having a bottom plate as a chassis main and accommodating the tray with an optical disc mounted thereon. The apparatus records and reproduces data on and from the optical disc as accommodated with the tray in the housing. The tray has a mechanical unit, a printed circuit board, and a first protruding portion. The mechanical unit is attached on the tray and includes a spindle motor and an optical pickup module. In the printed circuit board, a circuit for driving the mechanical unit is implemented. The printed circuit board is attached on a surface of the tray that is opposed to the chassis main. The first protruding portion is formed on the tray in a vicinity of the printed circuit board to protrude toward the chassis main. The chassis main has a second protruding portion formed on the chassis main to protrude toward the tray at a position to be opposed to the first protruding portion while the tray is accommodated in the housing.

While the tray is accommodated in the housing, there is a predetermined clearance between the first protruding portion and the second protruding portion opposed to the first protruding portion. When the tray deforms, the second protruding portion opposed to the first protruding portion supports the first protruding portion and prevents further deformation of the tray.

The apparatus further includes a cover bottom disposed between the tray and the chassis main and attached on the tray to cover the mechanical unit and the printed circuit board. The cover bottom has a third protruding portion formed on the cover bottom to protrude toward the chassis main.

While the tray is accommodated in the housing, there is a predetermined clearance between the third protruding portion and the chassis main. When the tray deforms, the third protruding portion comes into contact with the chassis main before all the other members.

According to the apparatus, even when the tray of PCB-integrated type receives an impact, the PCB does not suffer from damage that would otherwise be caused by hitting of the PCB against the housing (chassis), thereby enhancing the reliability of the optical disc apparatus.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Figure 1:
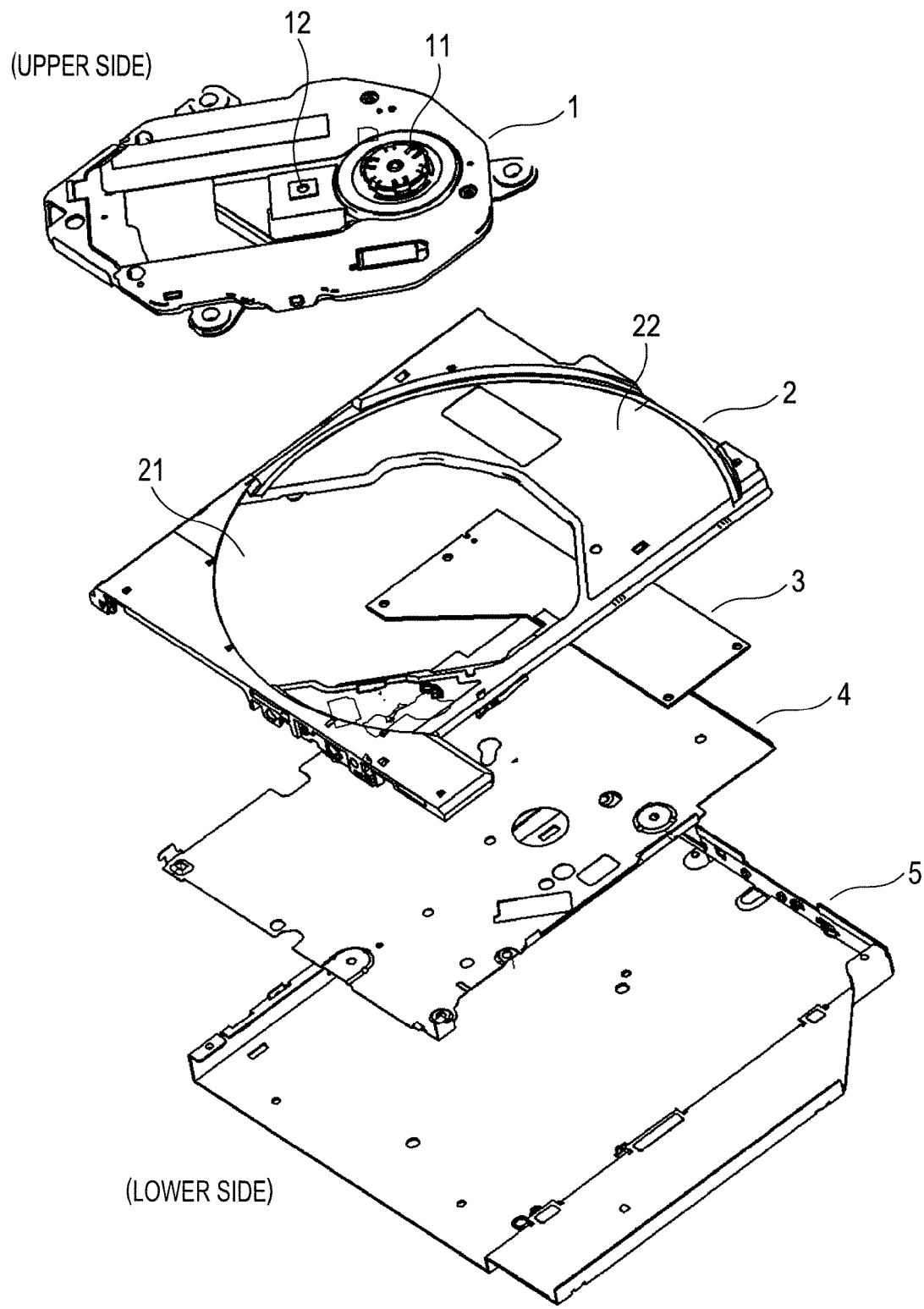
FIG. 1 is an exploded perspective view of an optical disc apparatus according to one embodiment of the invention.

Hereinafter, there will be described one embodiment of the invention by referring to the drawings.

FIG. 1 is an exploded perspective view of an optical disc apparatus according to one embodiment of the invention. The apparatus includes a mechanical unit 1 including a spindle motor, a tray 2 on which an optical disc is mountable, a printed circuit board (PCB) 3, a cover bottom 4, and a chassis main 5 which is a bottom plate of a housing. In the description below, the side of the mechanical unit 1 and the side of the chassis main 5 will be respectively referred to as an upper side and a lower or under side.

The members 1-5 will be described. The mechanical unit 1 includes a spindle motor 11 and an optical pickup module 12 which irradiates an optical disc with a laser beam to record and reproduce data on and from the optical disc. The tray 2 has an opening portion 21 at which the mechanical unit 1 is attached, and a mount surface 22 on which an optical disc is mounted. In the PCB 3 are implemented a circuit for driving the spindle motor 11 and the optical pickup module 12 in the mechanical unit 1, and a circuit for processing a signal involved in recording or reproduction on or from an optical disc. The PCB 3 is integrally attached on an under surface of a rear portion of the tray 2. The PCB 3 is connected with the mechanical unit 1 by a flexible printed circuit (FPO) board (not shown) which enables signal transfer. The cover bottom 4 is attached on the under surface of the tray 2 to cover and protect the mechanical unit 1 and the PCB 3 as well as prevent that the signal line extending from the PCB 3, i.e., the FPC, protrudes toward the chassis main 5. The chassis main 5 accommodates the tray 2 on which the mechanical unit 1, PCB 3, and cover bottom 4 are integrally attached. Between the tray 2 and the chassis main 5 is disposed a rail (not shown) to enable the tray to smoothly move or slide on the chassis main 5 into and out of the housing. Although not shown, on the upper side of the tray 2 is disposed a top case as an upper cover attached to the chassis main 5 to make the shape of the housing box-like.

Figure 2:
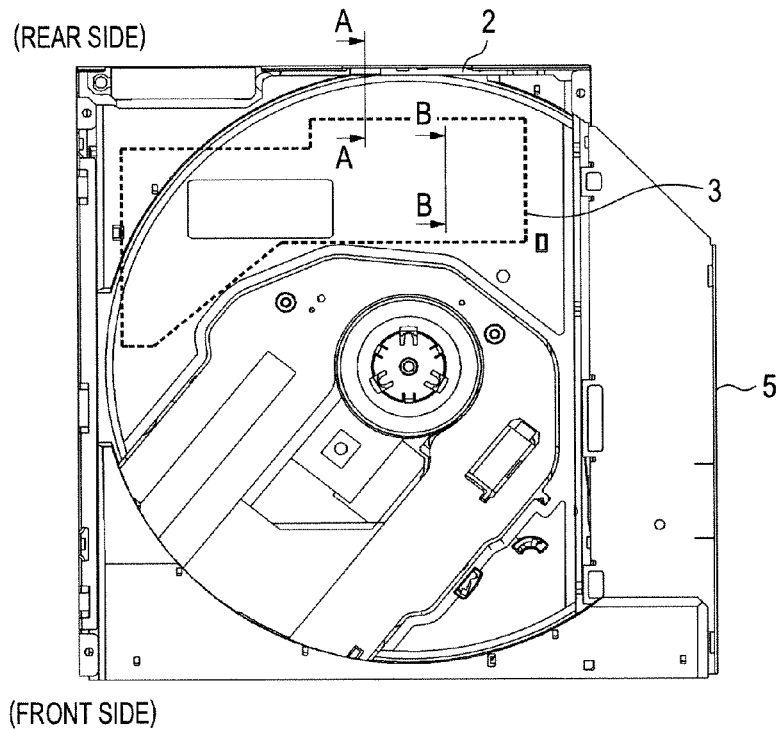
FIG. 2 is a plan view of the optical disc apparatus.

FIG. 2 is a plan view of the optical disc apparatus and shows a state where the tray 2 is accommodated in the chassis main 5. In an actual view as seen from the upper side, the PCB 3 and the cover bottom 4 are under the tray 2 and the mechanical unit 1 and cannot be seen. However, in FIG. 2 a position where the PCB 3 is located is indicated by a broken line. The PCB 3 is located in a rear portion of the tray 2 not to interfere with the mechanical unit 1 and others. The tray 2 with the PCB 3 thus attached thereon warps and deforms when an impact is exerted from the external on the tray 2, for instance, when an external force is applied to the tray 2 in a direction perpendicular to the sheet in which FIG. 2 is presented. When an amount of the warp is large, the PCB 3 hits the chassis main 5 or comes into contact therewith.

According to the embodiment, even when the tray receives an impact, the PCB 3 is prevented from hitting the chassis main 5 by the following features 1 and 2.

Figure 3:
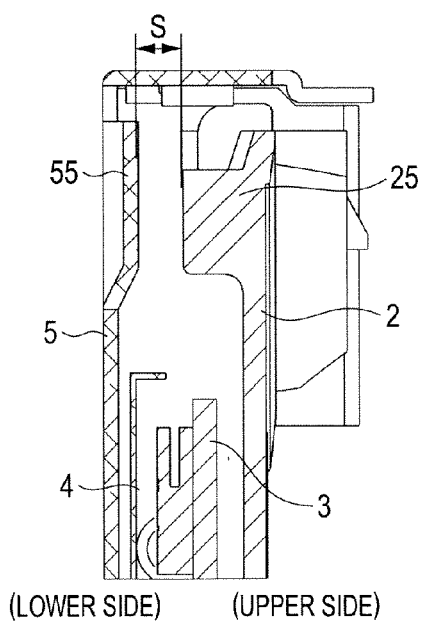
FIG. 3 shows cross-sectional views taken along lines A-A and B-B in FIG. 2.
Figure 3:
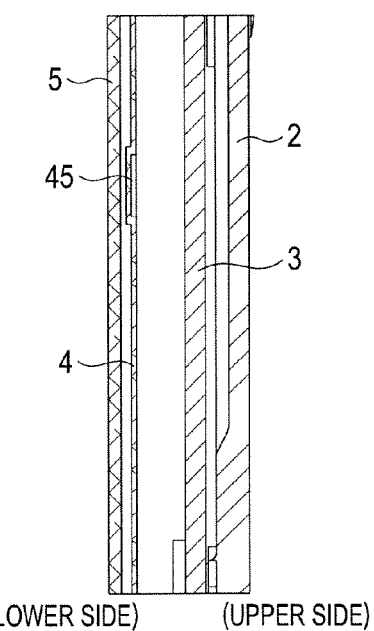

FIG. 3 shows fragmentary cross-sectional views of the optical disc apparatus shown in FIG. 2 that are taken along lines A-A and B-B in FIG. 2.

<Feature 1>

As shown in the cross-sectional view along the line A-A, on the tray 2 is formed a protruding portion 25 like a rib that protrudes toward the chassis main 5. On the other hand, on the chassis main 5 is formed a protruding portion 55 to protrude toward the tray 2, at a position to be opposed to the protruding portion 25. The protruding portion 25 of the tray 2 is disposed on the rear side with respect to the PCB 3, and a height of the protruding portion 25 is made larger than the thickness of the PCB 3, more strictly, a lower surface of the protruding portion 25 is on the further lower side than an under surface of the PCB 3. Between the protruding portion 25 of the tray 2 and the protruding portion 55 of the chassis main 5, there is a clearance S, and in a normal state the two protruding portions 25, 55 are not in contact with each other. The clearance S may appropriately be about 0.1 mm, for instance. With this feature, even when the tray 2 receives an impact and deforms to warp toward the chassis main 5, further deformation of the tray 2 is prevented by the protruding portion 25 of the tray 2 being contacted with and supported by the protruding portion 55 of the chassis main 5. Consequently, contact or hitting of the PCB 3 attached on the tray 2 against the chassis main 5 is prevented, and thus damage of the PCB 3 is prevented.

<Feature 2>

In addition to the above-described feature 1, a protruding portion 45 is formed on the cover bottom 4 to protrude toward the chassis main 5, as shown in the cross-sectional view taken along the line B-B. For instance, a height of the protruding portion 45 may be about 0.1 mm, and there is a clearance between the protruding portion 45 and the chassis main 5. With this feature 2, even when the tray 2 deforms to warp toward the chassis main 5, further deformation of the tray 2 is prevented by the protruding portion 45 being contacted with the chassis main 5 before all the other members including the PCB 3. Consequently, hitting of the PCB 3 against the chassis main 5 is prevented, and further an impact that the other members on the tray 2 receives is alleviated.

Referring to further drawings, the features 1 and 2 will be described in more detail.

Figure 4A:
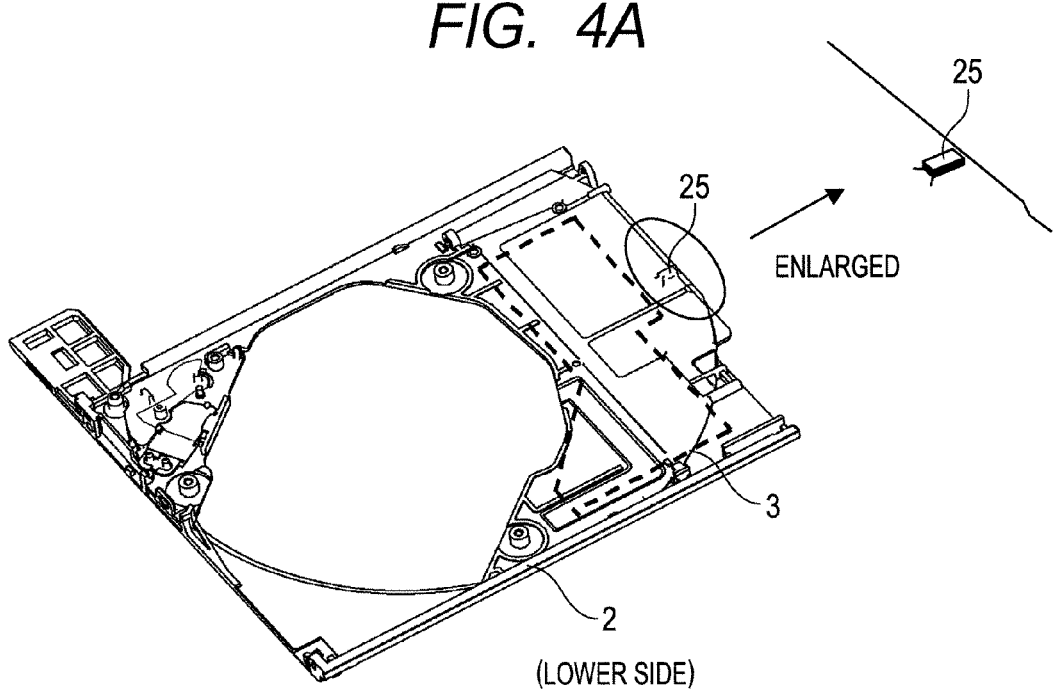
FIG. 4A is a perspective view of a tray as seen from the under side, with a part thereof shown in enlargement.

FIG. 4A is a perspective view showing the tray 2 as seen from the under side, with a part thereof shown in enlargement. On the rear portion of the tray 2 is attached the PCB 3, although FIG. 4A shows a state where the PCB 3 is removed. The protruding portion 25 corresponding to the feature 1 is formed in a vicinity of, and on the rear side of, a position at which the PCB 3 is attached. The protruding portion 25 can be easily formed in a forming process of the whole tray 2. Although a single protruding portion 25 is formed in this embodiment, a plurality of protruding portions 25 maybe formed such that the protruding portions are arranged along or around an area at which the PCB 3 is attached. Where a plurality of protruding portions 25 are formed, even a large-sized PCB 3 is prevented from hitting the chassis main 5.

Figure 4B:
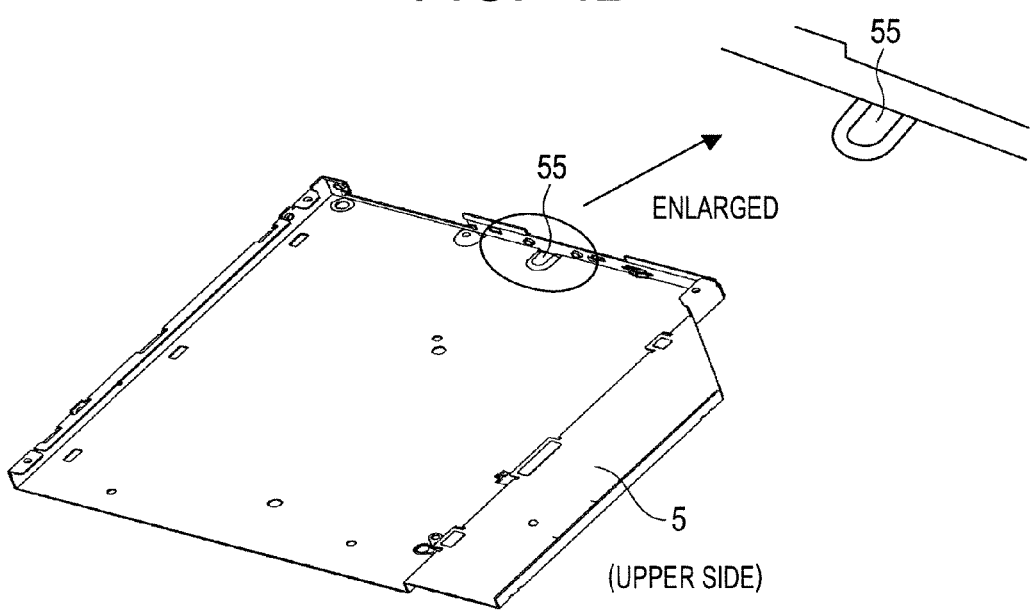
FIG. 4B is a perspective view of a chassis main as seen from the upper side, with a part thereof shown in enlargement.

FIG. 4B is a perspective view showing chassis main 5 as seen from the upper side, with a part thereof shown in enlargement. On the chassis main 5, a single or a plurality of protruding portion(s) 55 corresponding to the feature 1 is formed at a position to be opposed to the protruding portion 25 of the tray 2 (shown in FIG. 4A) as accommodated in the housing. A side surface of the protruding portion 55 of the chassis main 5 provides a gentle slope. Hence, when the protruding portion 25 of the tray 2 comes into contact with the protruding portion 55 of the chassis main 5 while the tray 2 is being moved into the housing to be accommodated therein, the tray 2 or its protruding portion 25 ascends or slides on the slope and can easily surmount the protruding portion 55. The protruding portion 55 of the chassis main 5 maybe formed such that an area of a base thereof is larger than that of the protruding portion 25 of the tray 2 in order that the protruding portion 55 can reliably support the protruding portion 25 even where there is a positional error therebetween. Whether with such an arrangement related to the base areas or not, the protruding portion 55 can be easily formed in a forming process of the whole chassis main 5.

Figure 5:
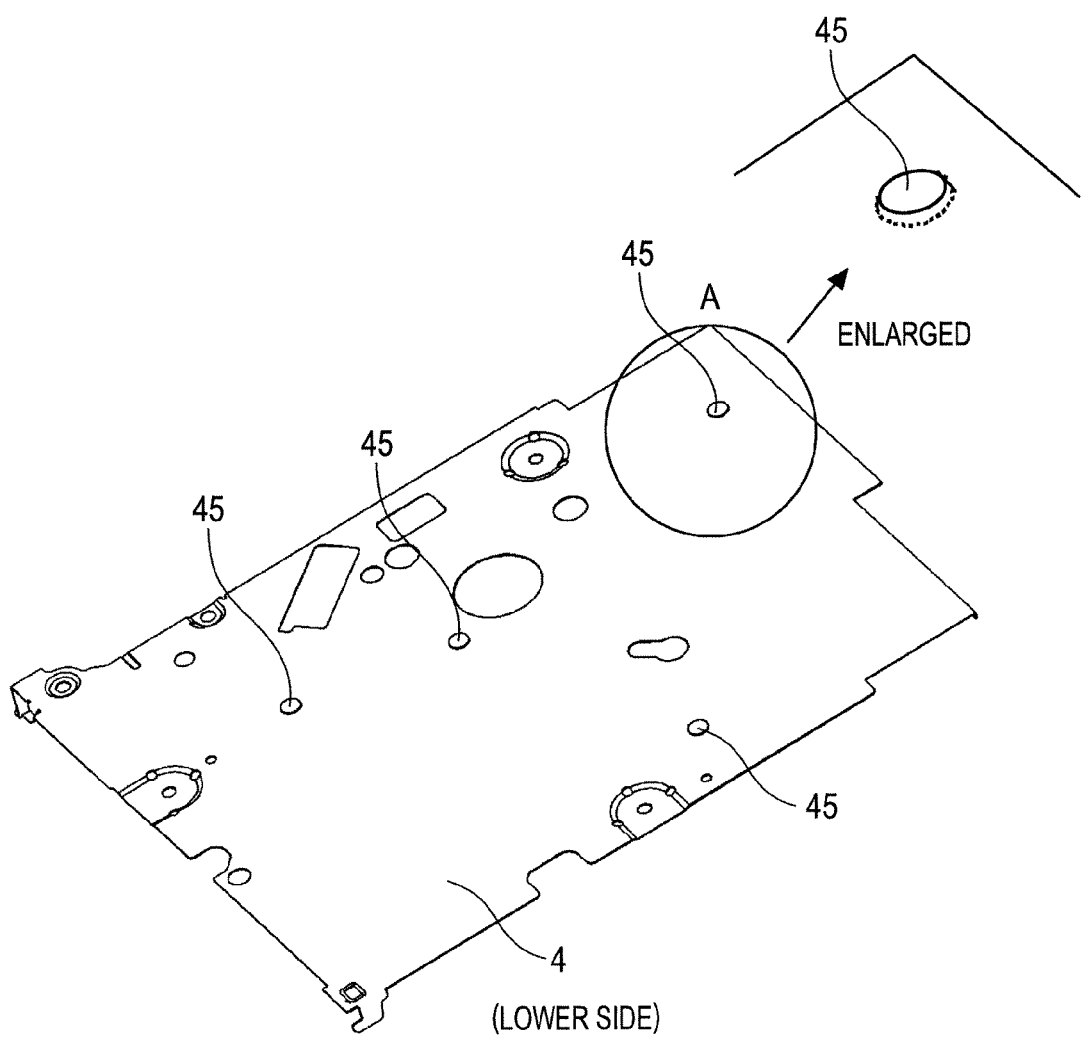
FIG. 5 is a perspective view of a cover bottom as seen from the under side, with a part thereof shown in enlargement.

FIG. 5 is a perspective view of the cover bottom 4 as seen from the under side, with a part thereof shown in enlargement.

The cover bottom 4 has a plurality (four in the specific example of FIG. 5) of protruding portions 45 formed on an under surface thereof and corresponding to the feature 2. Each of the protruding portions 45 is disposed in an area corresponding to a portion of the tray 2 at which the tray 2 is apt to deform. Forming the protruding portions 45 on the cover bottom 4 is advantageous in that where an impact is exerted on the tray 2, the cover bottom 4 hits the chassis main 5 before all the other members to alleviate or buffer the impact, and in that a place at which the cover bottom 4 contacts the chassis main 5 at the time of its hitting against the chassis main 5 is limited to the protruding portions 45 to facilitate taking measures against impacts. More specifically, the center of gravity of the tray 2 is located on the side of an area where the mechanical unit 1 is attached, and the tray 2 more tends to deform at this area. Hence, the protruding portions 45 are preferably disposed in a vicinity of this area. Although in this example the shape of the protruding portion 45 is circular, the shape of the protruding portion 45 is not limited thereto and may be rectangular, for instance. Irrespective of its shape, the protruding portion 45 can be easily formed in a forming process, namely, a drawing process, of the whole cover bottom 4.

As described above, according to the embodiment, the protruding portions 25, 55 are respectively formed on the tray 2 and the chassis main 5 at the positions to be opposed to each other, thereby enabling to prevent the PCB 3 attached on the tray 2 from hitting the chassis main 5. Further, by forming the protruding portion 45 on the cover bottom 4 to protrude toward the chassis main 5, an impact that the tray 2 receives can be alleviated.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus comprising:
a tray on which an optical disc is mounted;
a housing having a bottom plate as a chassis main and accommodating the tray with an optical disc mounted thereon, the apparatus recording and reproducing data on and from the optical disc as accommodated with the tray in the housing;
the tray having:
a mechanical unit attached on the tray and including a spindle motor and an optical pickup module;
a printed circuit board in which a circuit for driving the mechanical unit is implemented, the printed circuit board being attached on a surface of the tray that is opposed to the chassis main; and
a first protruding portion formed on the tray in a vicinity of the printed circuit board to protrude toward the chassis main; and
the chassis main having a second protruding portion formed on the chassis main to protrude toward the tray at a position to be opposed to the first protruding portion while the tray is accommodated in the housing.

2. The optical disc apparatus according to claim 1, wherein while the tray is accommodated in the housing, there is a predetermined clearance between the first protruding portion and the second protruding portion opposed to the first protruding portion,
and wherein when the tray deforms, the second protruding portion opposed to the first protruding portion supports the first protruding portion and prevents further deformation of the tray.

3. The optical disc apparatus according to claim 1, wherein an area of a base of the second protruding portion is larger than an area of a base of the first protruding portion.

4. The optical disc apparatus according to claim 1, wherein a surface of the first protruding portion on the side of the chassis main is closer to the chassis main than a surface of the printed circuit board on the side of the chassis main.

5. The optical disc apparatus according to claim 1, further comprising a cover bottom disposed between the tray and the chassis main and attached on the tray to cover the mechanical unit and the printed circuit board, the cover bottom having a third protruding portion formed on the cover bottom to protrude toward the chassis main.

6. The optical disc apparatus according to claim 5, wherein while the tray is accommodated in the housing, there is a predetermined clearance between the third protruding portion and the chassis main,
and wherein when the tray deforms, the third protruding portion comes into contact with the chassis main before all the other members.

* * * * *